Patented Mar. 27, 1934

1,952,509

UNITED STATES PATENT OFFICE 1,952,509

COMPO FLOORING, WALL, ETC.

Herman C. Nielsen, Howard City, Mich., assignor to National Wood Products Company, Detroit, Mich., a corporation of Delaware No Drawing. Application May 23, 1930,
Serial No. 455,147

5 Claims. (Cl. 94—3)

The present invention relates to a plastic building element, such as a floor or wall or wainscotting or a ceiling, the same being formed of a plurality of layers.

I will give a specific example of the invention as applied to flooring, it being understood that the invention is not restricted to these specific details.

For forming the base composition I take say 70 parts of sawdust, which may be ordinary mill-run sawdust, which does not have to be separated into different sizes of particles. The sawdust may be from mixed woods, such as maple, birch, beech or the like, and this material may also contain small amounts of sawdust from other kinds of wood. However I preferably do not employ oak, which is less advisable on account of the high content of tannins contained therein. Chestnut would likewise be objectionable. Pine does not give such a good hard surface and it is accordingly less suitable than maple and the like above referred to. Yellow pine sawdust contains a substantial amount of rosin or resinous material which may to some extent coact with alkalies present in the binder solution.

To the above I add say 15 parts of a casein solution, and say 5 parts of fish oil. The casein solution may be made by dissolving 1 pound of casein in 3 gallons of water containing about 0.24% of caustic potash, this being accordingly approximately a 4% solution of casein.

A small amount, say 5 to 10% or even 15% of very finely powdered sulphur may also be added if desired, although this is usually not needed in the base composition. I may also employ a small amount, say half a per cent of slaked lime along with the sawdust. This can be omitted if desired. Caustic potash is referred to and this is preferable to caustic soda, as giving a casein solution having better distributing properties.

The composition so prepared, by mixing the above materials in the proportions stated, is a plastic composition which can be readily spread and troweled upon any kind of surfaces, either cement, wood, composition flooring or the like, or if applied to walls can be applied upon lathing or upon old plaster, plaster boards, wood, cement or brick or other suitable foundation.

This composition is preferably troweled upon the base, leaving a somewhat rough surface, and is then allowed to dry, say over night or for a few days.

A top coat is then applied, which may be made up of 75 parts of wood flour, preferably made from such woods as maple, birch, beech or the like, 20 parts of casein solution as above described, 5 parts of fish oil, to which 10 to 15 per cent of finely powdered sulphur is preferably added, and any desired mineral or pigment color can also be added. The mixture is then worked until substantially homogeneous and is troweled upon the base coat above described, and smoothed down to give a finished floor or wall. A small amount of slaked lime can also be used in the top coat if desired.

The sulphur if used is preferably in the form of a very fine powder, say powdered sulphur which will pass through a 200 mesh screen.

The entire material is then allowed to stand and dry out and harden, which may require several days. This gives a floor or wall which is virtually composed of wood as the major ingredient. The other materials however have altered the material somewhat and the material itself does not burn as readily as ordinary wooden boards, for example. If lime is used, the same acts as a decided hardener in the composition, and also further reduces the inflammability.

In preparing the casein solution above referred to, I preferably use about the minimum quantity of caustic potash which is capable of dissolving the casein used, in order not to have a solution which will still contain an excess of free alkali.

One convenient method of operating is to mix together the casein solution (in alkali) together with the fish oil, and pour this mixture upon the sawdust or wood flour or mixture of sawdust and wood flour with other dry solid materials as sulphur, mineral or pigment color, slaked lime and the like, to form a pasty or plastic mixture which is then spread as indicated.

The floors or walls produced in accordance with the present invention will readily take all kinds of paint or varnish or other finish, as may be desired. Such floors or walls are also antiseptic and free from smell. The fish oil may have a little smell when the floor is first put down, but this will disappear within a few weeks and the floor then becomes permanent. The floors have good non-conducting and insulating properties, both as regards heat and sound, and they are sufficiently elastic to yield to slight settlement of the building during the course of years, without producing objectionable cracks therein.

Even before applying paint or varnish, the floors will not be unduly absorbent, as regards water.

I have referred above to two layers, the base layer and a top layer. It will be understood that several layers can be used if desired, say two or more coats of the base layer with one coat of the top layer applied thereto after drying, or after partly drying.

It is of course possible to produce pattern effects, by applying the base layer over the entire floor, then applying a top layer of one color within certain patterns, and a top layer of a different color outside of the said pattern. The patterns may consist of removable elements which are then removed and the places previously occupied by the same can be filled with still a different color of composition.

The element produced in accordance with the present invention can take nails or tacks readily, for example for hanging pictures or for tacking down carpets or rugs, if desired.

I claim:—

1. A plastic building element, built in situ, comprising a plurality of layers, the base layer containing comminuted woody material, fish oil and casein, the top layer containing fine comminuted woody material, fish oil and casein, the ratio of casein to fish oil being much greater in the top layer than in the base layer.

2. In the product of claim 1, the addition of powdered sulphur to the composition of at least one of said layers.

3. A plastic building element as described, built in situ, comprising a base layer and a top layer, the base layer comprising sawdust as its largest component together with fish oil and casein; the top layer comprising wood flour as its largest component, together with fish oil, casein and fine sulphur.

4. In making building elements as set forth in claim 1, the step of applying the casein in the form of a solution dissolved in caustic potash which latter is not in any substantial excess.

5. A building unit comprising casein, comminuted wood and fish oil in intimate mixture.

HERMAN C. NIELSEN.